June 7, 1938.  D. R. MERRILL  2,119,749
METHOD FOR CONTINUOUS FILTRATION OF WAX BEARING OILS
Filed Feb. 2, 1935
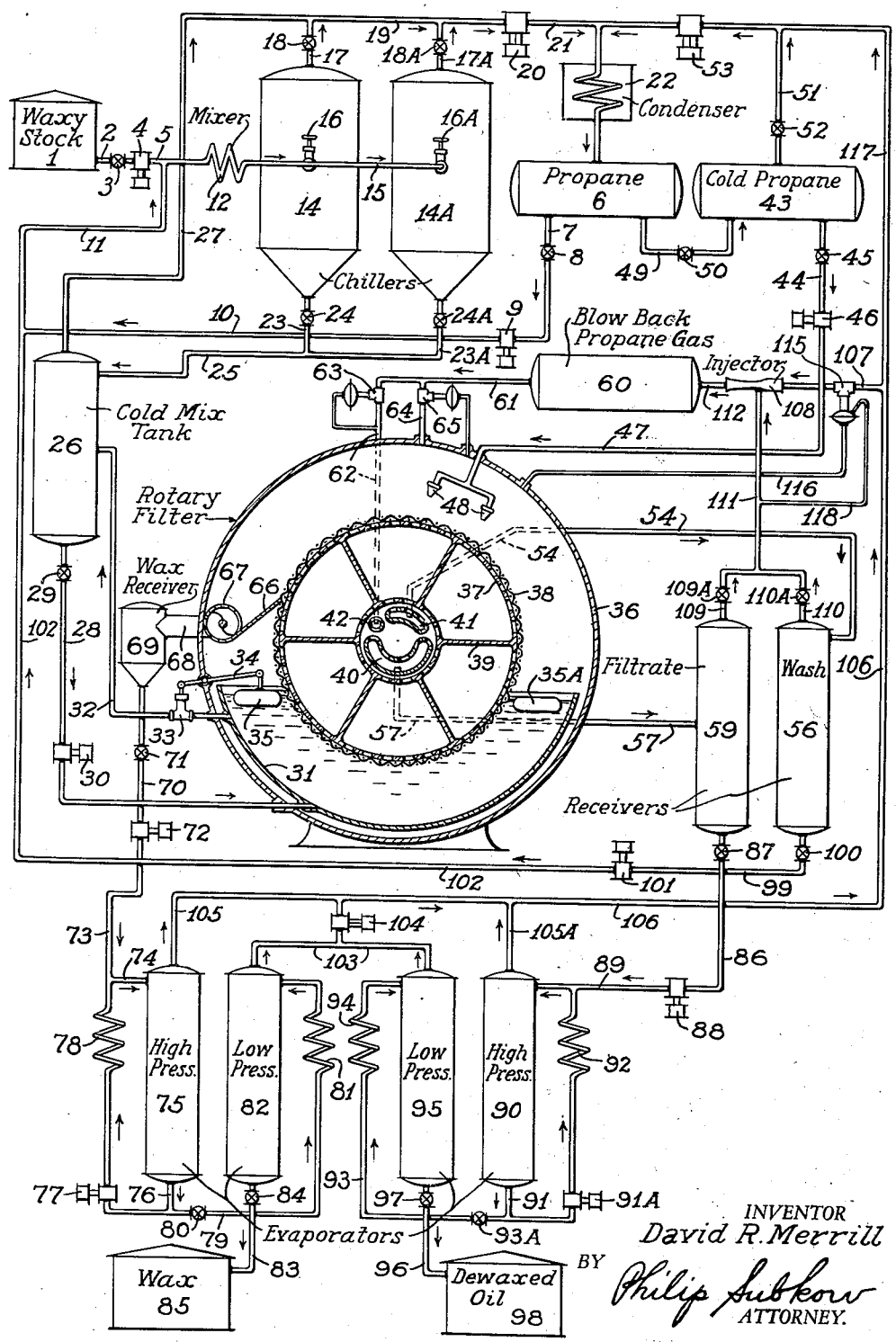
INVENTOR
David R. Merrill
BY Philip Subkow
ATTORNEY.

Patented June 7, 1938

2,119,749

UNITED STATES PATENT OFFICE 2,119,749

METHOD FOR CONTINUOUS FILTRATION OF WAX BEARING OILS

David R. Merrill, Long Beach, Calif., assignor to Union Oil Company of California, Los Angeles, Calif., a corporation of California Application February 2, 1935, Serial No. 4,658

5 Claims. (Cl. 196—19)

The present invention relates to continuous filtration and, more particularly, to a method and apparatus for the continuous filtration of wax from wax bearing oils dissolved in very light solvents such as propane The usual continuous filters employed for the purpose of filtering cold slurries of oil, diluent, such as propane and congealed wax, contain a filtering drum which is slowly rotated within a shell, the lower portion of which is filled with the cold slurry from which it is desired to separate the congealed wax. The filter drum rotating in the oil-containing shell is usually only partly submerged in the slurry. To effect filtration through the filter medium, a differential is maintained between the pressures within the filter drum and in the space between the filter drum and the shell. The filtrate is thus forced into the interior of the filter drum from which it is withdrawn and passed to a filtrate receiver.

In prior practice, when using such liquefied normally gaseous solvents as propane, the desired pressure drop is obtained by maintaining the temperature of the slurry on one side higher than that of the clarified filtrate on the other side, the lowered temperature being attained by vaporization of propane as the filtrate passes through the filter element.

In recent years, it has been found inadvisable to operate the filtrate receiver at a pressure below the vapor pressure of the propane from the slurry in the feed trough of the continuous filter. This is due to the fact that the liquid phase of the slurry is necessarily saturated with wax and vaporization of the propane as a result of the pressure drop across the filter element causes wax in the liquid phase to precipitate in the interstices of the fabric, which progressively renders it more impervious to the passage of liquid, thus cutting down the filter rate and the efficiency of the filter until no appreciable filtration takes place.

In the more recent processes of continuous filtration, pressure is exerted upon the surface of the slurry by the introduction of a gas such as propane into the chamber surrounding the filter drum. This pressure is maintained greater than the vapor pressure of the solvent in the slurry. The filter medium is immersed in this liquid and on the low pressure or filtrate side, a pressure is maintained by vapors of the solvent, which pressure is slightly greater than, or at least equal to, the vapor pressure of solvent in the clarified filtrate. The pressure on the slurry is always maintained at a differential of a few pounds only, say 2 to 8 pounds per square inch, over that of the clear filtrate. If a high pressure differential is maintained in such systems employing a condensable gas, as propane, the high pressure causes an excessive condensation of propane in the wax slurry and particularly on the wax cake which warms it up, redissolves wax and carries the wax into and through the filter element. Also, if the pressure on the filtrate side is not maintained above or equal to the vapor pressure of the filtrate, there will be flashing of propane from the inner filter surface which causes deposition of viscous oil and wax in the pores of the filter element thereby clogging it up and impairing, if not actually stopping, the flow of diluted oil or wash liquid therethrough. Another important feature in the foregoing process resides in the introduction of back-blow gas, preferably propane, into the interior of the filter drum to facilitate wax cake discharge from the filter element which gas passes into the outer chamber surrounding the filter drum and which builds up a pressure therein.

The compression of low pressure propane gas such as occurs at the wash and filtrate receivers entails the use of large and expensive compression equipment, such as mechanical vacuum pumps and compressors. This has been found particularly true where it is desired to compress propane gases from subatmospheric to superatmospheric pressure such as sometimes exist in such wash and/or filtrate receivers. I have found that the higher pressure of propane gas in the filter chamber surrounding the filter drum and the back-blow gas may be maintained in a more advantageous and economical manner than employed previously by the use of an injector or thermo-compressor by taking low pressure vapors from the wax and filtrate receivers and compressing them by means of high pressure propane gas taken from the propane storage tank or from any other convenient point in the system to a suitable pressure for use as back-blow gas or for introduction directly into the filter chamber. By the use of high pressure propane gas in the injector, several times the weight of the propane gas from the low pressure of the filtrate and wash receivers can be compressed to the pressure necessary for the back-blow. In this way, the cost of equipment required for compressing propane vapors is considerably reduced. Moreover, because of the lack of limitation as to operating temperatures of the thermo-compressor as compared with mechanical compressors, the refrigeration present in the cold vapors from the filtrate and wash receivers is to a substantial extent conserved.

It is thus an object of my invention to provide a method and apparatus which represents an improvement in the method of operating previous systems for dewaxing oils employing a continuous filter.

It is an important object of my invention to provide a system wherein the higher pressure propane or other gas employed for maintaining pressure in the continuous filter is provided in a more advantageous and economical manner than provided previously.

A further object of my invention is to utilize the cold low pressure propane gas from the filtrate and/or wash receivers, after raising its pressure as back-blow or filter chamber gas. The main object of my invention is to compress the low pressure gas from the filtrate and/or wash receivers by means of high pressure propane in an injector or thermo-compressor to a suitable pressure for use as back-blow gas or for introduction into the filter chamber.

Broadly stated, my invention resides in a process and apparatus for compressing a low pressure gas by means of a high pressure gas in an injector or thermo-compressor. The invention is particularly a process for separating wax from chilled slurries of diluted oil and wax in which process low pressure and particularly, cold low pressure gas or vapor such as the vapor from the diluent employed is thermally compressed by means of a high pressure gas.

More particularly stated, the invention resides in a process and apparatus for separating wax from oils wherein the waxy oil is first diluted with a liquefied normally gaseous hydrocarbon and the mixture chilled to congeal the wax and form a slurry of diluted oil and congealed wax and the mixture filtered in a continuous filter by maintaining a differential pressure between the slurry and filtrate sides of the filter element and a pressure on the filtrate side of the filter element is maintained above or equal to the vapor pressure of the filtrate, the said pressures being maintained by a gas or vapor, preferably if the same composition as the vapor of the solvent employed to dilute the oil, introduced into the chamber surrounding the filter element and/or into the interior of the filter element and the filtrate and wash liquid passed to receivers, the step of raising the pressure of the cold diluent vapors evaporating from the filtrate and/or wash liquid or of any low pressure gas or vapor produced in the system by means of a high pressure gas or vapor in an injector or thermo-compressor and passing the compressed gas or vapor into the chamber surrounding the filter element and/or into the filtrate side of the filter. It is a feature of the invention to control the passage of high pressure gas to the thermo-compressor by the differential pressure of the chamber surrounding the filter element and the filtrate and/or wash receivers.

Other objects and features of my invention will be apparent from the following description taken from the drawing which is not to be intended as limiting my invention but merely illustrative of one method of carrying it out.

Referring to the drawing, a waxy lubricating oil stock, such as an S. A. E. 30 lubricating oil distillate prepared from Santa Fe Springs crude or any other stock from which it is desired to remove wax, is taken from tank 1 and passed into line 2 controlled by valve 3 and pumped by pump 4 into line 5 where it meets a stream of liquefied normally gaseous hydrocarbon such as liquid propane under superatmospheric pressure sufficient to maintain the propane in a liquid state at normal temperatures. The propane is taken from storage tank 6 via line 7 controlled by valve 8 and pumped by pump 9 which forces the liquid propane through lines 10 and 11 into line 5. While I prefer to use liquid propane as a combined diluent and refrigerant, it will be observed that any normally gaseous diluents, such as butane, iso-butane, butylene, ethane, ethylene, propane, propylene, methyl chloride, methyl ether and the like may be used either separately or in admixture with each other.

The waxy oil and liquid propane brought together by means of separate pumps are passed through mixer 12 into chillers 14 and 14A via line 15 controlled by valves 16 and 16A. Chillers 14 and 14A may be operated alternately by proper operation of valves 16 and 16A. The mixture is chilled by permitting a portion of the liquid propane to vaporize under a gradually reduced pressure, or external refrigeration may be used. Pressure is controlled by valves 18 and 18A on lines 17 and 17A, respectively, and compressor 20. By opening valves 18 and 18A, vaporized propane is passed into line 19 to the suction of compressor 20 where the propane vapor is compressed and is then passed through line 21 to condenser 22 where the propane under pressure is condensed and returned into propane storage tank 6. By reducing the pressure in chillers 14 and 14A to approximately atmospheric, the temperature will be reduced to approximately —40° F. at which temperature substantially all of the wax dissolved in the solution will crystallize, forming a slurry of crystallized wax in oil and propane. This slurry is withdrawn via lines 23 and 23A controlled by valves 24 and 24A, respectively, and passed via line 25 into cold mix tank 26. Propane vaporized in cold mix tank 26 is withdrawn via line 27 and returned to the propane storage tank 6.

The chilled slurry, preferably in the ratio of approximately 3 to 4 volumes of propane to one of the oil and wax, is withdrawn from the bottom of the cold mix tank via line 28 controlled by valve 29 and pumped by pump 30 into the feed bowl 31 of the continuous filter. The slurry is preferably introduced more rapidly than it is filtered and the excess is returned to the cold mix tank through line 32 in amounts regulated by valve 33 which is operated by control 34 actuated by float 35 which, in turn, is supported on the surface of the slurry in feed bowl 31. Floats 35A may be provided to protect the surface of the slurry from the warmed propane gases used to provide pressure in the filter and thus to reduce condensation of propane gas in the wax slurry.

The continuous filter may be of any well known type and as a preferred example, I will describe the use of a cylindrical or rotary filter having an insulated gas tight pressure casing 36 enclosing a perforated drum 37 having a filter element 38 on its periphery which may be of canvas or other suitable material. The filtering drum 37 is divided into a plurality of segments by means of imperforate plates 39, these segments being connected by sliding ports, first to the filtrate discharge port 40, then to the wash liquid port 41 and finally to the back-blow port 42. Cold wash liquid is introduced from cold propane tank 43 via line 44 controlled by valve 45 and pumped by pump 46 through line 47 and is sprayed onto the wax cake by perforated pipes or nozzles 48. The cold propane may be produced by passing a portion of the propane under pressure from propane storage tank 6 via line 49 controlled by valve 50 into tank 43 from which a portion is vaporized to obtain refrigeration of the remainder, the vaporized propane being returned to tank 6 via line 51 controlled by valve 52, compressor 53 and condenser 22.

Wash propane may be withdrawn through pipe 54 and passed into wash receiver 56. Filtrate may be withdrawn through pipe 57 and passed into filtrate receiver 59. The pressure in lines 54 and 57 is preferably controlled by the vapor discharge pipes which lead from the wash and filtrate receivers to which these pipes are respectively connected.

Pressure is maintained between the filter shell and the drum by means of propane gas from tank 60 and line 61. A portion of this gas is introduced through line 62 into port 42 as back-blow gas to facilitate cake discharge, the amount of gas introduced being controlled by pressure regulator 63. If the amount of back-blow gas is insufficient to establish the desired pressure differential across the filter medium, gas is also introduced at a somewhat lower pressure directly between the shell and the filter element through pipe 64 regulated by pressure regulating valve 65.

The wax cake is removed from the filter element by scraper 66 and conveyed by scroll conveyor 67 through conduit 68 into wax receiver 69 from which it is withdrawn via line 70 controlled by valve 71 and pumped by pump 72 through lines 73 and 74 into high pressure evaporator 75. The wax is depropanized in high pressure evaporator 75 by continuously circulating it through line 76 and pump 77, heater 78 and back to the evaporator. When substantially all of the propane vaporizable under high pressure is removed, the melted wax is passed into line 79 controlled by valve 80 through heater 81 into low pressure evaporator 82 for the purpose of removing the remaining propane from the wax at a lower pressure. The depropanized wax is withdrawn via line 83 controlled by valve 84 and passed into wax storage tank 85.

The filtrate from filtrate receiver 59 is withdrawn via line 86 controlled by valve 87 and pumped by pump 88 through line 89 into high pressure evaporator 90 from which it is continuously recycled through line 91, pump 91A, heater 92, back into high pressure evaporator. After evaporating propane under high pressure, it is withdrawn via line 91 and passed through line 93 controlled by valve 93A, heated in 94 and introduced into low pressure evaporator 95 in which all of the remaining propane is vaporized under low pressure. The depropanized and dewaxed oil is withdrawn via line 96 controlled by valve 97 and passed into dewaxed oil storage tank 98.

The wash propane in receiver 56 is withdrawn via line 99 controlled by valve 100 and pumped by pump 101 and through lines 102 and 11 into line 5 where it may be commingled with fresh waxy stock and propane.

The propane vaporized from low pressure evaporator 82 and 95 is withdrawn via lines 103 and compressed by compressor 104 and may then be mixed with propane vaporized under high pressure from high pressure evaporators 75 and 90 and which is withdrawn via line 105 and 105A and passed into line 106 and line 107 to injector 108 where the low pressure vapors from filtrate and wash receivers 59 and 56 passing through lines 109 and 110, respectively, controlled by valves 109A and 110A, respectively, and line 111 to the constricted portion of injector 108 is raised by thermo-compression by the high pressure propane gas, from which it passes through line 112 into back-blow propane gas receiver 60. The introduction of high pressure propane gas into the injector is controlled by differential pressure regulating valve 115 which is connected by line 116 to the space between the shell and filter drum of the filter, and by line 118 to line 111 and thus to the filtrate and wash receivers. Excess high pressure gas is returned to storage tank 6 via line 117, compressor 53 and condenser 22.

Alternatively, high pressure gas for operation of thermo-compressor 108 may be taken from the vapor space of propane storage tank 6. This has the advantage that the propane gas will usually be at a lower temperature than when taken directly from the evaporators.

It is to be understood that the above description of my invention is merely illustrative of preferred embodiments of my invention of which many variations within the scope of the following claims may be made by those skilled in the art without departing from the spirit thereof.

What is claimed is:

1. In a method for separating wax from a diluted oil-wax slurry in a filter wherein filtration is effected by maintaining a differential in pressure between the slurry side and the filtrate side of the filtering element of said filter and in which relatively cold low pressure vapor is separated from the filtrate and in which relatively warm high pressure vapor is also separated from the filtrate, the steps of compressing said relatively cold low pressure vapor by means of said relatively warm high pressure vapor in a thermo-compressor and returning said compressed vapors to said filter to aid in the filtration of said diluted oil-wax slurry.

2. In a method for separating wax from a diluted oil-wax slurry in a filter wherein filtration is effected by maintaining a differential pressure between the slurry side and the filtrate side of the filtering element of said filter, the steps of passing filtrate from said filter to a filtrate receiver, separating a relatively cold low pressure vapor from said filtrate receiver, vaporizing liquid from said filtrate under pressure to produce a relatively warm high pressure vapor, compressing said separated relatively cold low pressure vapor by means of said relatively warm high pressure vapor in a thermo-compressor and returning said compressed vapor to said filter to aid in the filtration of said diluted oil-wax slurry.

3. In a method for separating wax from a diluted oil-wax slurry in a filter wherein filtration is effected by maintaining a differential pressure between the slurry side and the filtrate side of the filtering element of said filter, the steps of passing filtrate from said filter to a filtrate receiver, separating a relatively cold low pressure vapor from said filtrate receiver, vaporizing liquid from said filtrate under pressure to produce a relatively warm high pressure vapor, compressing said separated relatively cold low pressure vapor by means of said relatively warm high pressure vapor in a thermo-compressor and returning said compressed vapor to said filter to aid in the filtration of said diluted oil-wax slurry and controlling passage of high pressure vapor to said thermo-compressor by differential pressure of said filter and filtrate receiver.

4. A method as in claim 2 in which the diluent used to produce the diluted oil-wax slurry comprises a liquefied normally gaseous hydrocarbon and in which the vapors from the filtrate are vapors of the same composition as said diluent.

5. In a method for separating wax from a diluted oil wax slurry in a filter wherein filtration is effected by maintaining a differential pressure between the slurry side and the filtrate side of the filtering element of said filter and in which the wax cake on the filtering element is washed with liquid of the same composition in said diluted oil-wax slurry, the steps of passing filtrate from said filter to a filtrate receiver and said wash liquid to a wash liquid receiver, separating relatively cold low pressure vapor from said filtrate and wash liquid receivers, vaporizing liquid from said filtrate under pressure to produce a relatively warm high pressure vapor, compressing said separated relatively cold low pressure vapor by means of said relatively warm high pressure vapor in a thermo-compressor and returning said compressed vapor to said filter to aid in the filtration of said diluted oil-wax slurry.

DAVID R. MERRILL.